Nov. 27, 1962     K. M. MAIERSHOFER     3,065,874
PHOTOGRAPHIC SLIDE TRAYS AND MEANS FOR COUPLING SAME
Filed Oct. 15, 1959
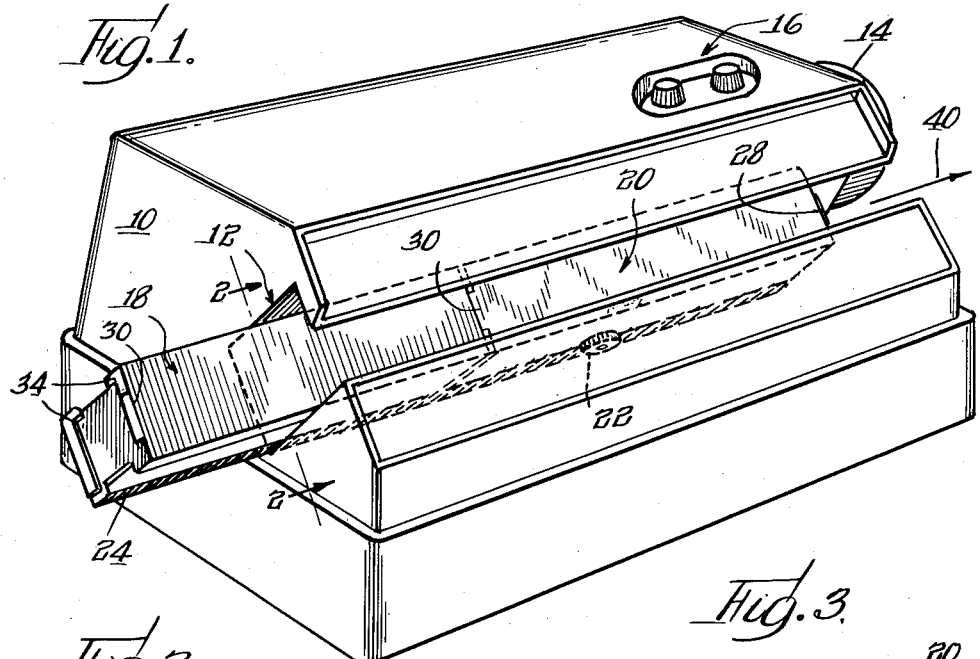
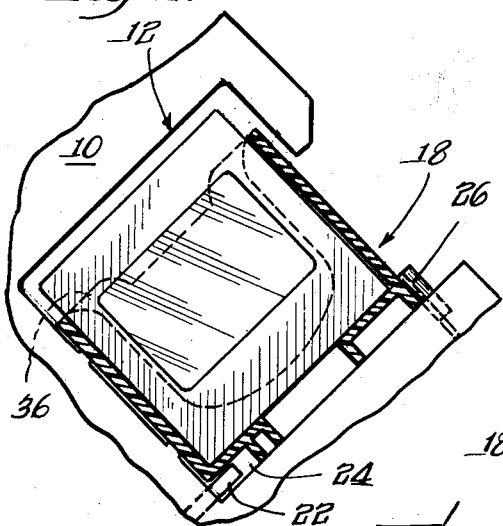
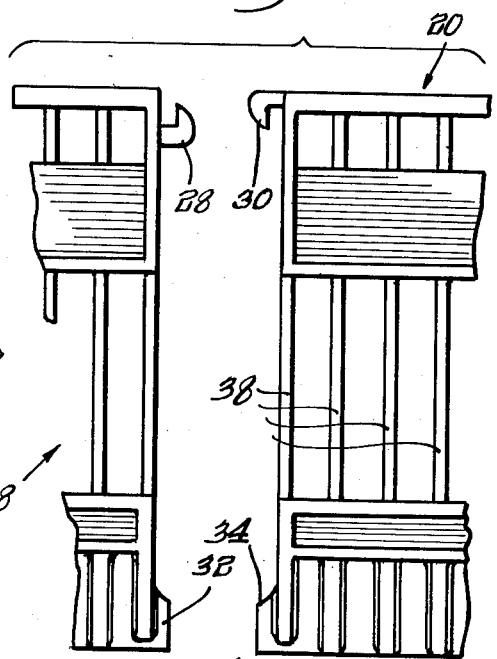
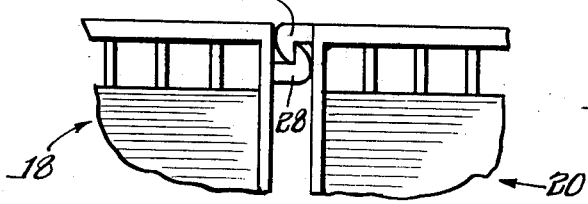
INVENTOR.
Karl M. Maiershofer
BY Olson & Trexler
Attys

United States Patent Office

3,065,874
Patented Nov. 27, 1962

3,065,874
PHOTOGRAPHIC SLIDE TRAYS AND MEANS
FOR COUPLING SAME
Karl M. Maiershofer, Norridge, Ill., assignor to G-M
Laboratories Inc., Chicago, Ill., a corporation of Illinois
Filed Oct. 15, 1959, Ser. No. 846,610
6 Claims. (Cl. 220—23.4)

This invention relates generally to automatic projectors for photographic slides and more particularly to photographic slide trays and means for coupling the same.

With the advent of automatic projectors for photographic slides, the viewing of slides has been greatly facilitated. In these automatic slide projectors, a tray, ordinarily containing 36 or 40 slides, is passed through the projector in increments corresponding to the distance allotted the individual slide-carrying channels. The slide trays are customarily manufactured by a plastic molding operation.

As the slides are being projected, the tray progresses through the changer mechanism of the projector; and when the last slide has been returned to the tray, it becomes necessary manually to bring the leading end of a new tray into contact with the trailing end of the previous tray in order to continue uninterrupted viewing. In an effort to reduce this inconvenient, manual operation, longer trays containing as many as 80 slides have been developed. However, these elongated trays have been beset with warpage difficulties in the molding operation and with handling and storage problems during use by the consumer.

Therefore, an important object of the present invention is to provide improved means for increasing the number of slides which may be automatically projected for viewing.

Another object of the invention is to provide improved slide trays which may be selectively and conveniently coupled together.

Yet another object of the invention is to provide a slide tray train system in which the train may be arranged to be of any desired length.

A further object of the invention is to provide a slide tray train system in which trays may be continuously coupled at one end of the train and continuously uncoupled at the other end.

A still further object of the invention is to provide slide trays which are coupleable together and which are economical to manufacture.

Additional objects and features of the invention pertain to the particular structure and arrangements whereby the above objects are attained.

In order that the principle of the invention may be readily understood, a single embodiment thereof is shown in the accompanying drawing wherein:

FIG. 1 is a perspective view of an automatic slide projector employing slide trays constructed in accordance with the invention;

FIG. 2 is an enlarged view through the section 2—2 of FIG. 1;

FIG. 3 is an enlarged, fragmentary, bottom plan view of confronting ends of two slide trays showing the catch means of the invention, the trays being uncoupled; and FIG. 4 is a fragmentary view of the arrangement of FIG. 3 showing the catch means coupling the trays together.

Referring now in detail to the drawing, specifically to FIG. 1, an automatic slide projector generally indicated at 10 includes a tray tunnel 12, a lens mount 14 and operating controls such as are illustrated generally at 16. The tray tunnel 12 is arranged to receive one or more photographic slide trays such as trays 18 and 20; and advantageously, the automatic projector 10 incorporates a drive sprocket 22 which engages the drive rack 24 provided on each of the trays in order to step the trays through the projector during its automatic operation.

As best shown in FIG. 2, one or more leaf springs 26 are mounted in association with tray tunnel 12, as for example to the floor of tunnel 12 opposite the sprocket 22, in order to restrict lateral movement of the trays received within the tunnel.

In accordance with an important feature of the invention, trays 18 and 20 are selectively coupleable in the longitudinal direction by catch means including elongated hooks 28 and 30, best shown in FIG. 3. Hooks 28 and 30 extend beyond confronting ends of the trays 18 and 20 and are disposed to open in opposite lateral directions so as to permit mutual engagement. Furthermore, hooks 28 and 30 are fashioned with rounded heads, which arrangement facilitates passage of the hooks beyond each other from the uncoupled to the coupled configuration when a compressive force is applied longitudinally to the trays. It has also proved advantageous to fabricate the hooks 28 and 30 integral with the corresponding slide tray as by being molded with the tray as a unit. Since the hooks 28 and 30 are intended to be engageable, they are desirably arranged adjacent corresponding lateral sides of the trays 18 and 20. As will be recognized, an outwardly opening hook 28 is provided at one end of the tray while an inwardly opening hook 30 is provided at the opposite end of the tray.

In order to insure proper alignment of trays 18 and 20, longitudinally extending spacers 32 and 34 are upraised from the opposite ends of each of the several trays. These spacers project from the ends of the trays adjacent at least two edges thereof, as is best shown in FIG. 1.

In compliance with customary practice, photographic slides such as slide 36 are spaced-apart in the slide trays by means of separators 38.

From the descriptions thus far given, it is apparent that when tray 20 is inserted in tunnel 12 so that rack 24 engages sprocket 22, operation of the projector 10 will step the tray 20 in the general direction indicated by arrow 40. After some portion of tray 20 has been stepped through the projector 10, tray 18 will conveniently be inserted in position behind tray 20 as is shown in FIG. 1. A slight compression of tray 18 against tray 20 will cause the rounded heads of hooks 28 and 30 to misalign the trays momentarily allowing the hooks to pass each other into the engaged configuration shown in FIG. 4. It is important to note that the arrangement of tray tunnel 12 and the provision of one or more leaf springs 26 restricts lateral movement of the trays and maintains the required degree of longitudinal alignment. Accordingly, the dimensions of the trays and of the tunnel are arranged to tolerate sufficient misalignment of the trays to permit the coupling action described immediately hereinabove.

With the hooks engaged, spacers 32 and 34 will confront each other so as to cooperate with the hooks in encouraging longitudinal alignment of the trays 18 and 20. Thus, when tray 20 is stepped past sprocket 22 the drive rack associated with tray 18 will become engaged by the sprocket continuing the automatic operation of projector 10 and extending the length of the viewing.

It will become apparent that tray 20 may be readily uncoupled from tray 18 by grasping the free end of tray 20 and applying tension or pulling in the general direction of arrow 40.

A train of slide trays may thus be provided by continuously coupling trays of fresh slides at the trailing or back end of the projector and continuously uncoupling or removing trays of viewed slides from the leading or front end of the projector.

The specific example herein shown and described is illustrative only. Various changes in structure will, no doubt, occur to those skilled in the art; and these changes are to be understood as forming a part of this invention insofar as they fall within the spirit and scope of the appended claims.

The invention is claimed as follows:

1. A photographic slide tray for automatic slide projectors, and comprising a tray structure having parallel end walls joined by side walls, a pair of hooks with one hook projecting from one end wall and the other hook projecting from the other end wall and both hooks being elongated along the respective end walls, the hook on one end wall being spaced from the adjacent side wall and opening toward the said adjacent side wall, the hook on the other end wall opening away from the said adjacent side wall and spaced outwardly of the other hook and toward the said adjacent side wall a distance such that the hooks on adjacent trays will mutually inter-engage for connecting adjacent trays while facilitating intentional disengagement of the hooks and separation of trays.

2. A photographic slide tray as claimed in claim 1, wherein there is provided spacer means projecting from said end walls and adapted to abut spacer means on an adjacent tray with the hooks engaged to assist in maintaining longitudinal alignment of adjacent trays.

3. A photographic slide tray as claimed in claim 2, wherein the spacer means comprises projecting surface portions along at least two adjacent edges of the end wall including one edge remote from the hook on said end wall.

4. A photographic slide tray train system comprising a plurality of slide trays adapted to be coupled together and each tray comprising a tray structure having parallel end walls joined by side walls, a pair of hooks with one hook projecting from one end wall and the other hook projecting from the other end wall and both hooks being elongated along the respective end walls, the hook on one end wall being spaced from the adjacent side wall and opening toward the said adjacent side wall, the hook on the other end wall opening away from the said adjacent side wall and spaced outwardly of the other hook and toward the said adjacent side wall a distance such that the hooks on adjacent trays will mutually inter-engage for connecting adjacent trays while facilitating intentional disengagement of the hooks and separation of trays.

5. A photographic slide tray train system as claimed in claim 4, wherein there is provided spacer means projecting from the end walls of each tray abutting the spacer means on an adjacent tray to cooperate with adjacent engaged hooks in maintaining longitudinal alignment of adjacent coupled trays.

6. A photographic slide tray train system as claimed in claim 5, wherein the spacer means comprises projecting surface portions along at least two adjacent edges of each end wall and including one edge remote from the hook on said end wall.

References Cited in the file of this patent

UNITED STATES PATENTS 2,865,121    Anderton _____ Dec. 23, 1958

FOREIGN PATENTS 11,427    Great Britain _____ May 31, 1905
166,449    Switzerland _____ Mar. 1, 1934